United States Patent [19]
Tanabe

[11] Patent Number: 6,160,961
[45] Date of Patent: *Dec. 12, 2000

[54] CAMERA WITH FLASH UNIT HAVING DISPLACEMENT ENHANCER

[75] Inventor: Minoru Tanabe, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/054,990

[22] Filed: Apr. 3, 1998

[30] Foreign Application Priority Data

Apr. 14, 1997 [JP] Japan .................................. 9-095651

[51] Int. Cl.⁷ ................................................... G03B 15/03

[52] U.S. Cl. ............................................................ 396/177

[58] Field of Search ..................................... 396/176, 177, 396/178, 155, 205

[56] References Cited

U.S. PATENT DOCUMENTS

| | | | |
|---|---|---|---|
| 4,166,681 | 9/1979 | Imura et al. | 396/176 X |
| 4,500,184 | 2/1985 | Morizumi et al. | 396/177 |
| 5,079,574 | 1/1992 | Ueno | 396/177 |
| 5,270,757 | 12/1993 | Tosaka et al. | 396/177 |
| 5,749,003 | 5/1998 | Tanabe | 396/177 |

*Primary Examiner*—David M. Gray
*Attorney, Agent, or Firm*—Robin, Blecker & Daley

[57] ABSTRACT

A camera includes a flash emission part arranged to move between a stowage position and a usage position, an operation member capable of being displaced by a sliding operation in a predetermined direction, and a transmission member which transmits to the flash emission part an amount of displacement of the operation member caused by the sliding operation, wherein the transmission member enlarges an amount of the sliding operation on the operation member and transmits the enlarged amount of the sliding operation to the flash emission part, so that the flash emission part is moved greater than the amount of displacement of the operation member.

16 Claims, 8 Drawing Sheets

CAMERA WITH FLASH UNIT HAVING DISPLACEMENT ENHANCER

BACKGROUND OF THE INVENTION

1. Field of the Invention

The present invention relates to a camera having an electronic flash device, and more particularly to a camera in which the electronic flash device is moved to be situated in different positions with respect to a camera body between during non-emission of flash light and during emission of flash light.

2. Description of Related Art

Cameras having a built-in flash device have been popularly in use. Meanwhile, reduction in size of these cameras has been furthered of late. The reduction in size of the cameras results in a less distance between the optical axis of the photo-taking lens and the optical axis of the electronic flash device. A distance from a camera to a photo-taking object such as a person (object distance) is, on the other hand, tending to increase because the zoom ratio of the photo-taking lens has become larger in general. The increase in object distance has increased the probability of having the so-called red-eye phenomenon, which takes place when a flash light emitted from the electronic flash device is made incident on the pupil of the photo-taking object (person) and is then reflected by the retina of the person. Therefore, it has become more important to suppress the red-eye phenomenon.

As one of known methods for suppressing the red-eye phenomenon, there is a method of contracting the pupil of the person (object) by causing an electronic flash device to preliminarily emit light or by lighting up a light source (a lamp) other than the electronic flash device immediately before taking a shot by flash photography. As another known method, there is a so-called pop-up electronic flash device in which the flash emission part thereof is moved away from the optical axis of a photo-taking lens before use of the electronic flash device.

The latter method, i.e., the pop-up electronic flash device, is employed in many cameras, because the flash emission part is arranged to be stowed inside the camera body at the time other than the time of taking a shot, for improved portability of the camera. Cameras having the pop-up electronic flash device are configured in different types. In one type, the camera is arranged to move the flash emission part by utilizing a moving force obtained in shifting a photo-taking lens barrel from a stowage position to a usage (photo-taking) position. In the case of another type, as disclosed in Japanese Laid-Open Patent Application No. HEI 7-225410, the flash emission part is mounted on a sliding cover of the camera body and, in taking a shot, the optical axis of the electronic flash device is moved away from the photo-taking lens at the same time that the photo-taking lens is exposed by sliding the sliding cover.

Further, according to a further known method disclosed in Japanese Laid-Open Patent Application No. HEI 8-62675, a film unit of the kind having a lens is arranged as follows. A range of distances between a photo-taking optical axis and a flashing optical axis within which the red-eye phenomenon tends to take place is presumed. A flash emission part is moved to a position farther than the presumed range in taking a shot and is left within the presumed range when no shot is taken.

BRIEF SUMMARY OF THE INVENTION

In accordance with one aspect of the invention, there is provided a camera, which comprises a flash emission part arranged to move between a stowage position and a usage position, an operation member capable of being displaced by a sliding operation in a predetermined direction, and a transmission member which transmits to the flash emission part an amount of displacement of the operation member caused by the sliding operation, wherein the transmission member enlarges an amount of the sliding operation on the operation member and transmits the enlarged amount of the sliding operation to the flash emission part, so that the flash emission part is moved greater than the amount of displacement of the operation member. Accordingly, a flash-emission-part moving mechanism can be simply and compactly formed to permit eventual reduction in size of the camera.

The above and other aspects and features of the invention will become apparent from the following detailed description of embodiments thereof taken in connection with the accompanying drawings.

DETAILED DESCRIPTION OF THE INVENTION

Hereinafter, preferred embodiments of the invention will be described in detail with reference to the drawings.

First Embodiment

Figure 1:
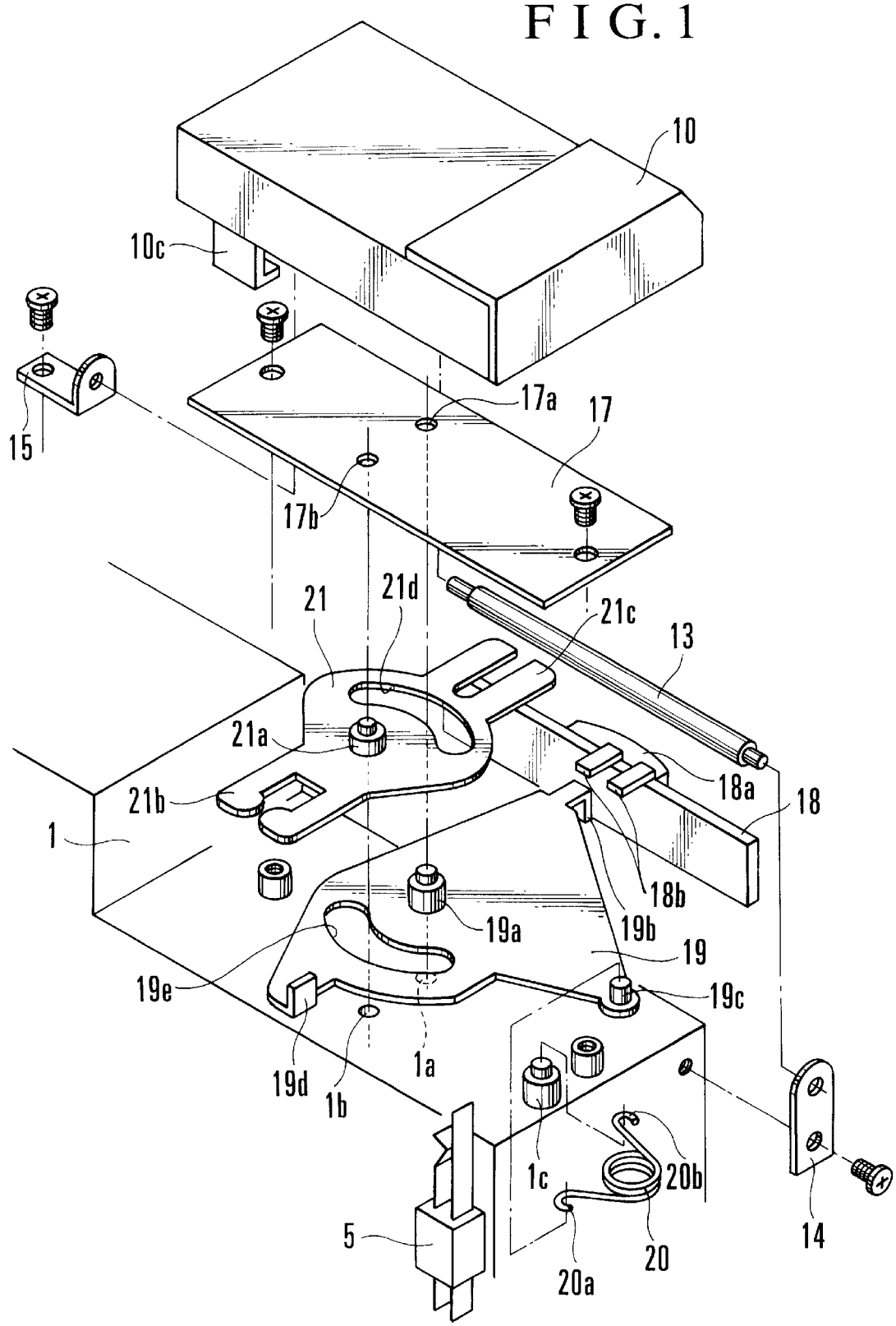
FIG. 1 is an exploded perspective view showing a flash-emission-part moving mechanism of a camera according to a first embodiment of the invention.
Figure 2:
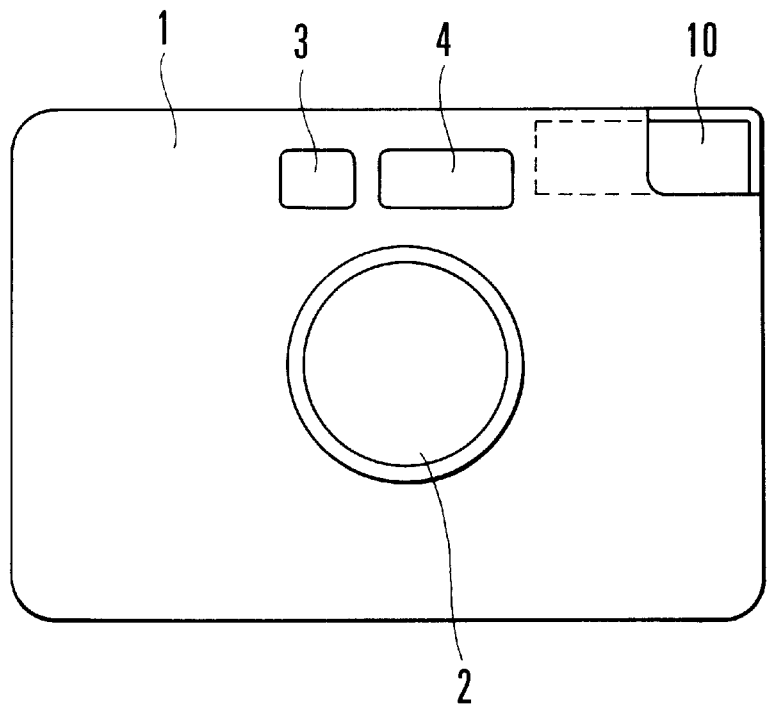
FIG. 2 is a front view showing the camera in a state of having a flash emission part thereof in a stowage position.
Figure 3:
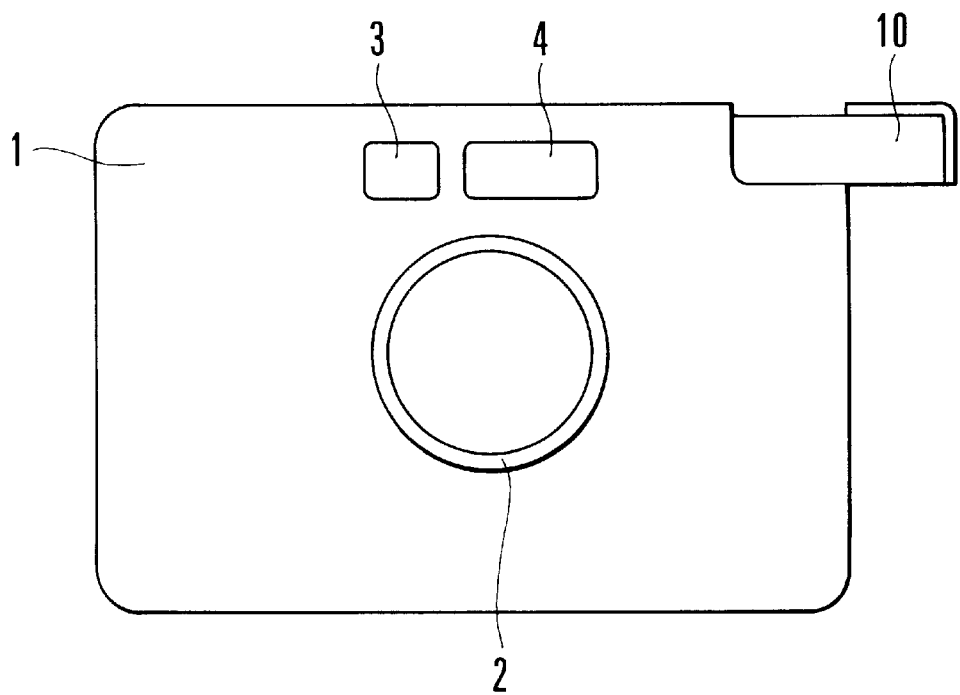
FIG. 3 is a front view showing the camera in a state of having the flash emission part in a protruding (usage) position.
Figure 4:
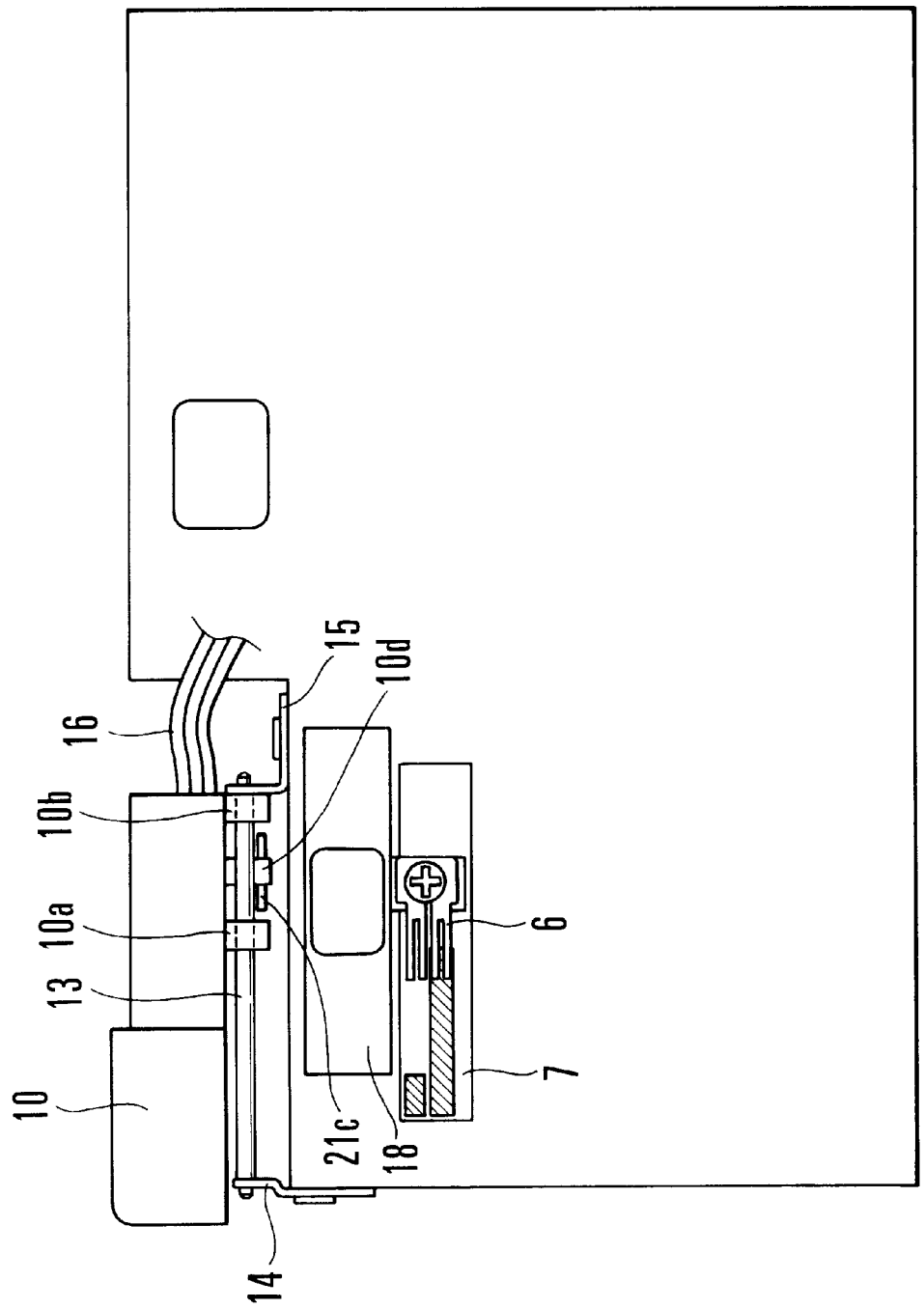
FIG. 4 is a rear view showing the flash-emission-part moving mechanism of the camera.
Figure 5:
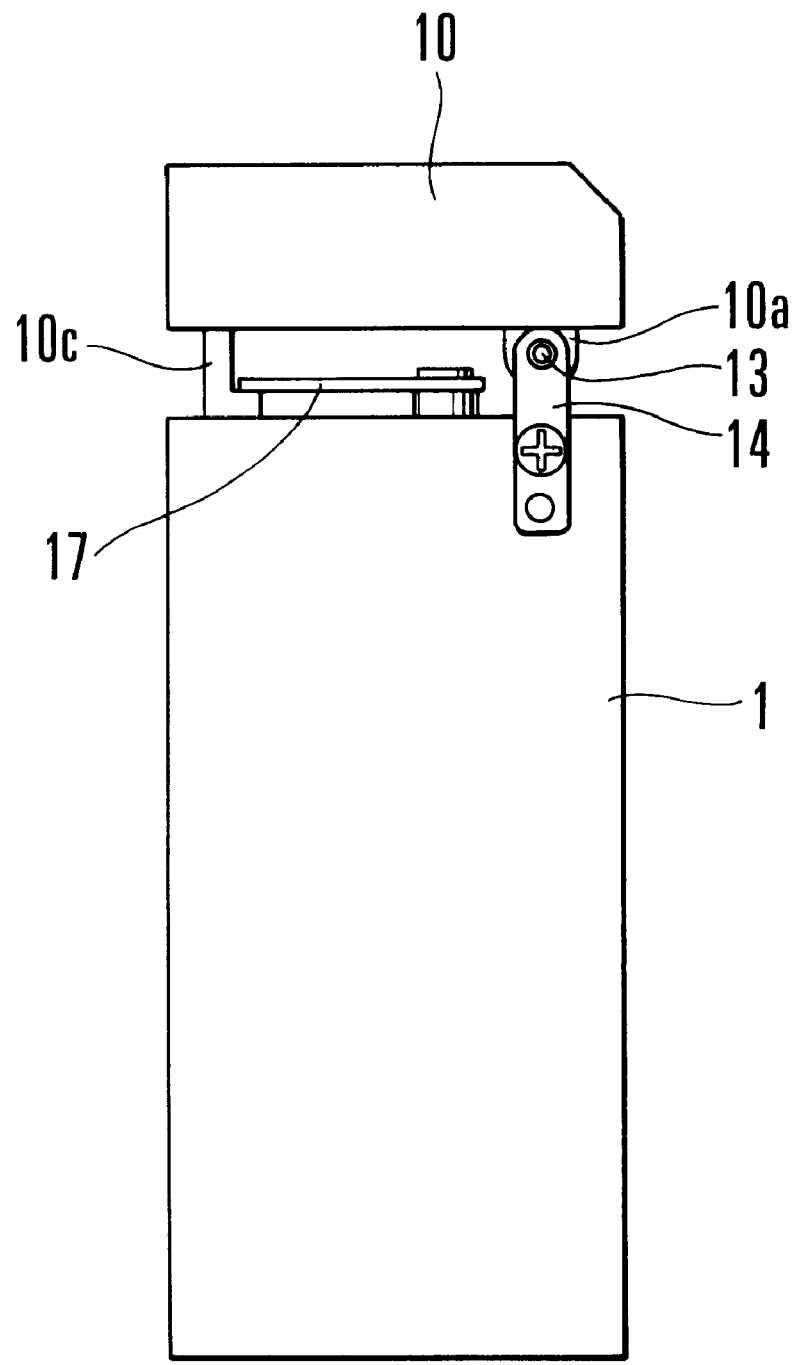
FIG. 5 is a side view showing the flash-emission-part moving mechanism of the camera.
Figure 6:
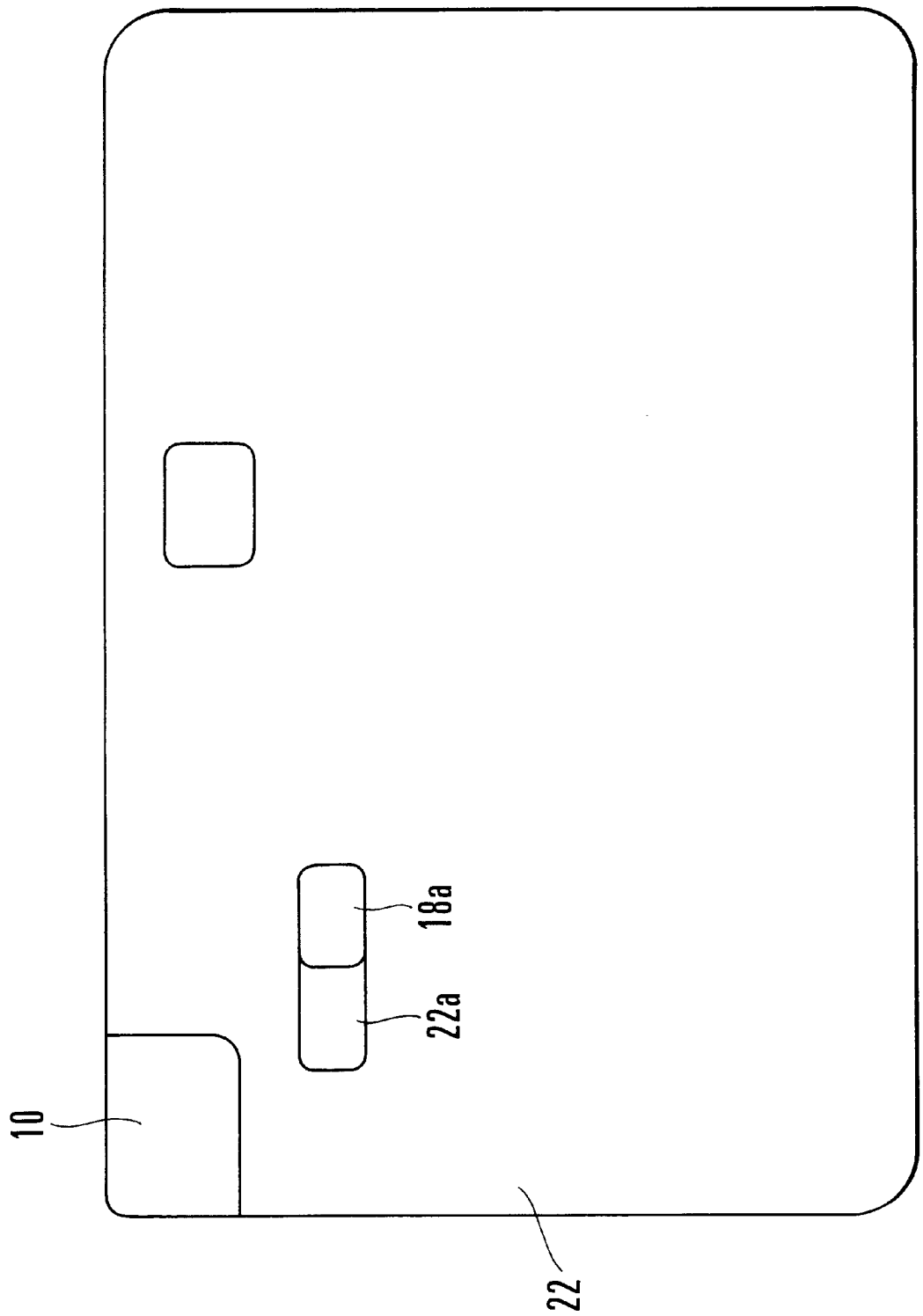
FIG. 6 is a rear view showing the camera.

FIGS. 1 to 6 relate to a camera according to a first embodiment of the invention. FIG. 1 shows the structural arrangement of a flash-emission-part moving mechanism of the camera. FIG. 2 shows the camera in a state of having a flash emission part in a stowage position. FIG. 3 shows the camera in a state of having the flash emission part in a protruding (usage) position. FIGS. 4 and 5 show the mounting structure of the flash emission part on the camera body. FIG. 6 is a rear view of the camera.

In FIG. 2, reference numeral 1 denotes a camera body, reference numeral 2 denotes a photo-taking lens, reference numeral 3 denotes a viewfinder, reference numeral 4 denotes an automatic focusing unit, and reference numeral 10 denotes a flash emission part. A discharge lamp, a reflection shade, an optical part, etc., are incorporated in a known manner within the flash emission part 10.

In the state shown in FIG. 2, the left half of the flash emission part 10 is stowed inside the camera body 1 and the power supply of the camera is in an off-state. In the other state shown in FIG. 3, the whole of the flash emission part 10 is exposed outside the camera body 1 and the power supply of the camera is in an on-state.

Referring to FIGS. 4 and 5, guide sleeves 10a and 10b are provided on the lower rear side of the flash emission part 10. The guide sleeves 10a and 10b are slidably engaged with a guide bar 13, so that the flash emission part 10 is slidably mounted on the camera body 1. The guide bar 13 is held at its two ends by bar holding members 14 and 15 which are secured to the camera body 1 with screws.

Referring to FIGS. 1 and 5, a hook part 10c is provided on the lower front side of the flash emission part 10. The hook part 10c is slidably engaged with the front edge of a base plate 17 which is secured to the camera body 1 with screws, so that the vertical position of the flash emission part 10 is determined.

As shown in FIG. 4, the flash emission part 10 is electrically connected by lead wires 16 to a flash emission circuit (not shown).

Next, the flash-emission-part moving mechanism arranged to slide the flash emission part 10 will be described. An operation member 18 is mounted on the camera body 1 from behind and is transversely slidable with respect to the camera body 1. The operation member 18 is provided with an operation part 18a. When a cover member 22 is mounted on the camera body 1 as shown in FIG. 6, the operation part 18a of the operation member 18 is exposed to the outside of the camera through a slot 22a formed in the cover member 22. The operation member 18 is thus arranged to have its vertical position restricted by the slot 22a and to be operable (slidable) only in the transverse direction of the camera body 1.

Further, as shown in FIG. 4, a contact piece 6 of a power supply switch is mounted on the operation member 18. When the operation member 18 is operated to be slid to the right or left, the power supply switch contact piece 6 slides over a switch pattern circuit board 7 which is mounted on the rear side of the camera body 1.

A first lever 19 shown in FIG. 1 is held on the camera body 1 with its shaft 19a rotatably fitted in a hole 17a formed in the base plate 17 and a hole 1a formed in the camera body 1. Further, the first lever 19 is interlinked to the operation member 18 with its input part 19b inserted in between two projections 18b formed on the operation member 18.

A second lever 21 which is disposed on the upper side of the first lever 19 is rotatably held on the camera body 1 with its shaft 21a fitted in a hole 17b formed in the base plate 17 and a hole 1b formed in the camera body 1. An arcuate slot 19e is formed in a position between the shaft 19a and an output part 19d of the first lever 19. The shaft 21a of the second lever 21 is fitted through the arcuate slot 19e into the hole 1b of the camera body 1. Another arcuate slot 21d is formed in a position between the shaft 21a and an output part 21c of the second lever 21. The shaft 19a of the first lever 19 is fitted through the arcuate slot 21d into the hole 17a of the base plate 17. It should be noted that the arcuate slots 19e and 21d are arranged to be large enough in size for allowing the first and second levers 19 and 21 to turn.

The output part 19d of the first lever 19 is interlinked to an input part 21b of the second lever 21 with a bent part of the output part 19d engaged with a forked part of the input part 21b. Further, a driving projection 10d which is formed on the lower side of the flash emission part 10 is engaged with a forked part of the output part 21c of the second lever 21. Accordingly, the operation member 18 is connected in the above manner to the flash emission part 10 through the first lever 19 and the second lever 21.

A toggle spring 20 has its one end 20a engaged with a shaft 19c of the first lever 19 and the other end 20b engaged with a shaft 1c of the camera body 1.

Figure 7:
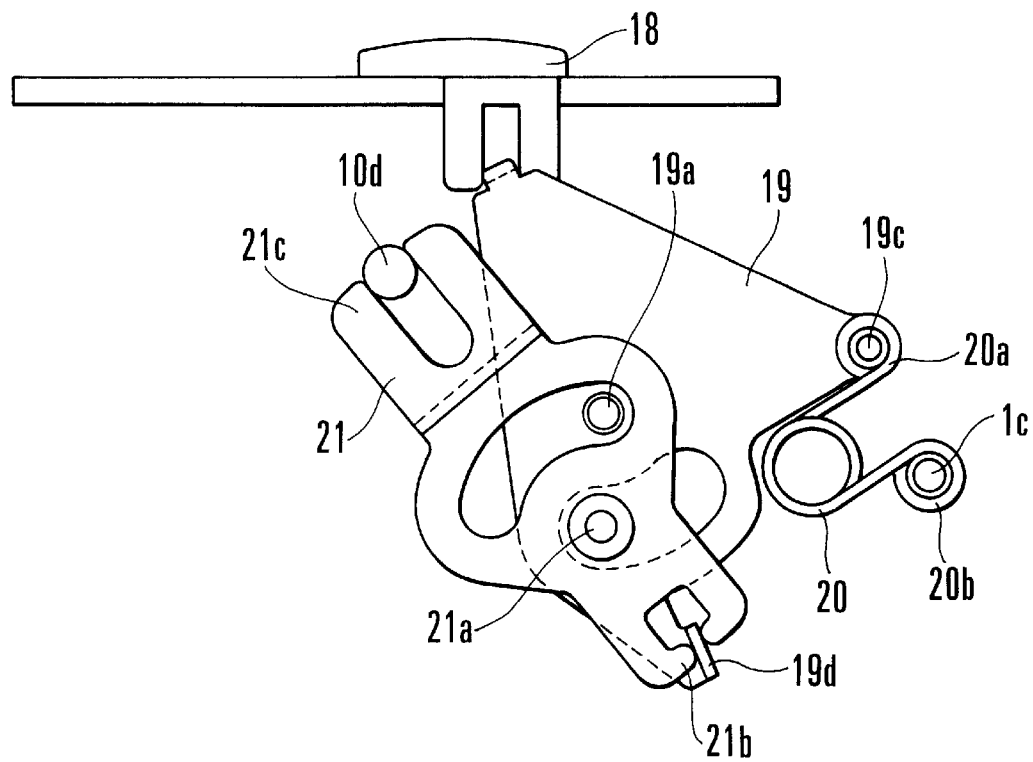
FIG. 7 is a diagram for explaining an operation of the flash-emission-part moving mechanism when the flash emission part is in the stowage position.
Figure 8:
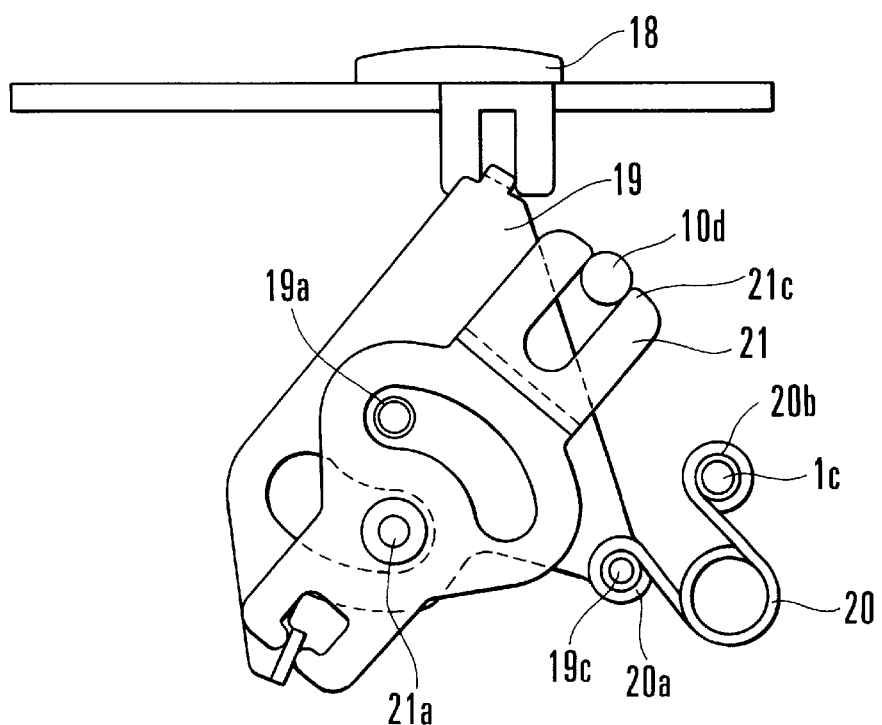
FIG. 8 is a diagram for explaining an operation of the flash-emission-part moving mechanism when the flash emission part is in the protruding position.

Next, an operation of the flash-emission-part moving mechanism will be described below with reference to FIGS. 7 and 8. FIG. 7 shows the flash-emission-part moving mechanism when the flash emission part 10 is in the stowage position, while FIG. 8 shows the flash-emission-part moving mechanism when the flash emission part 10 is in the protruding position.

In the state shown in FIG. 7, the first lever 19 is urged by the spring force of the toggle spring 20 to move counterclockwise on the shaft 19a. In this instance, however, the first lever 19 is never caused to turn any further by the spring force, since the position of the operation member 18 which engages the first lever 19 is restricted by the slot 22a of the cover 22. Meanwhile, the second lever 21 is urged through the first lever 19 by the spring force of the toggle spring 20 to move counterclockwise on the shaft 21a. The flash emission part 10 which engages the second lever 21 is thus urged also by the spring force of the toggle spring 20 to move toward the left, i.e., in the direction of stowing the flash emission part 10.

When the operation member 18 is operated, in the state shown in FIG. 7, to be slid to the right as viewed in FIG. 7, i.e., in the direction of protruding the flash emission part 10, the first lever 19 first turns clockwise on the shaft 21a against the spring force of the toggle spring 20. Then, the flash emission part 10 begins to move along the guide bar 13 in the direction of protruding from the camera body 1.

The clockwise turn of the first lever 19 causes the toggle spring 20 to turn counterclockwise on the other end part 20b. The toggle spring 20 continues to exert its counterclockwise urging force on the first lever 19 to urge the flash emission part 10 in the direction of stowing the flash emission part 10 until one end part 20a of the toggle spring 20 comes to a point at which the one end part 20a is in lateral alignment with the other end part 20b.

During this time, the one end part 20a of the toggle spring 20 gradually comes nearer to the other end part 20b. Therefore, the spring force of the toggle spring 20 gradually increases. When the operation member 18 and the flash emission part 10 approximately reach the middle points of their strokes of movement, respectively, i.e., when the turning shaft 19a of the first lever 19 and the two end parts 20a and 20b of the toggle spring 20 come to a point where they are in alignment, the spring force of the toggle spring 20 reaches its maximum value. However, no rotary urging force is exerted on the first lever 19 at this point of time.

With the operation member 18 further operated to be slid further toward the right, when one end part 20a of the toggle spring 20 has revolved beyond a point where the one end part 20a is in lateral alignment with the other end part 20b, the toggle spring 20 comes to impart a clockwise urging force to the first lever 19. As a result, the flash emission part 10 is urged to move in the direction of protruding. Therefore, after the operation member 18 is operated to be slid beyond the approximate middle point of its moving stroke, the first lever 19, the second lever 21 and the flash emission part 10 are respectively driven in the protruding direction by the spring force of the toggle spring 20, even if the operator of the camera takes his or her hand off the operation member 18. Further, the sliding motion of the operation member 18 causes the power supply switch contact piece 6 to slide over the switch pattern circuit board 7 to turn on the power supply of the camera.

When the operation member 18 is blocked from moving further with the operation part 18a coming to abut on the end face of the slot 22a of the cover member 22, the motion of the flash emission part 10 in the protruding direction also comes to a stop. In this state, the flash emission part 10 is stably held in its protruding (usage) position through the second lever 21, because the first lever 19 is urged clockwise by the toggle spring 20.

In addition, immediately (about 2 mm) before arrival of the flash emission part 10 at the protruding position, a flash-emission-part position detecting switch 5 shown in FIG. 1 is pushed to turn on by the hook part 10c of the flash emission part 10. Then, a camera control circuit (not shown) disposed inside the camera body 1 decides that flash emission (flashing) by the flash emission part 10 is possible. With the flash emission by the flash emission part 10 decided to be possible, the camera control circuit sends a charging start signal to a charging circuit of the electronic flash device for starting charging the electronic flash device. Upon completion of the charging of the electronic flash device, the charging circuit sends a signal indicating the completion of charging to the camera control circuit. The camera then comes to assume a standby state for a photo-taking operation.

Next, an operation of the flash-emission-part moving mechanism when the flash emission part 10 is stowed (when the power supply is turned off) after completion of the photo-taking operation will be described.

The stowing operation is performed conversely to the above-stated operation of turning on the power supply. When the camera operator moves the operation member 18 to the left from the position shown in FIG. 8, the first lever 19 begins to turn counterclockwise while gradually compressing the toggle spring 20. This causes the second lever 21 to begin to turn counterclockwise in association with the first lever 19. Then, in association with the second lever 21, the flash emission part 10 also begins to move to the left along the guide bar 13. In addition, the sliding motion of the operation member 18 then causes the power supply switch contact 6 to slide over the switching pattern circuit board 7 to turn off the power supply of the camera.

In this instance, too, the spring force of the toggle spring 20 is inverted when the operation member 18 and the flash emission part 10 come to pass the approximate middle points of their respective moving strokes. As a result, the flash emission part 10 comes to be urged in the direction of stowing. When the operation part 18a of the operation member 18 abuts on the end face of the slot 22a of the cover member 22 to block the operation member 18 from moving any further, the movement of the flash emission part 10 in the stowing direction also comes to a stop. In this state, the first lever 19 is urged by the toggle spring 20 in the counterclockwise direction, so that the flash emission part 10 is stably held in the stowage position through the second lever 21.

While the flash emission part 10 has been described above as arranged to be brought either into the protruding position or into the stowage position by operating the operation member 18, the flash emission part 10 can be pulled out to the protruding position or pushed into the stowage position directly by the operator of the camera, because the flash emission part 10 is perfectly interlinked to the operation member 18.

In the foregoing, the operation of the flash-emission-part moving mechanism in the first embodiment has been described in outline. The following description will be made about the first lever 19 and the second lever 21 in further detail. As shown in FIGS. 7 and 8, the first and second levers 19 and 21 are about equal to each other in lever length and are both arranged to extend in the forward and rearward directions of the camera body 1. With respect to a lever ratio, i.e., a ratio between a distance from an input end to a turning axis (shaft) and a distance from the turning axis (shaft) to an output end, the lever ratio of the first lever 19 is about 1:1, while the lever ratio of the second lever 21 is about 1:2. The turning shaft 21a of the second lever 21 is thus located closer to the output end 19d of the first lever 19 than the turning shaft 19a of the first lever 19. Therefore, the moving amount of the flash emission part 10 is about twice as much as the moving amount of the operation member 18.

In order to suppress the red-eye phenomenon, it is necessary to have the optical axis of the electronic flash device located away from the optical axis of the photo-taking lens as much as possible. However, if the camera is arranged to allow the operator to directly move the flash emission part, the flash emission part tends to be moved to such an excessive extent that makes it difficult to operate the camera by one hand, so that the operability of the camera is degraded. To solve this problem, the flash-emission-part moving mechanism in the first embodiment is arranged to move the flash emission part 10 to an extent which is about twice as much as the amount of the operation on the operation member 18. With the flash-emission-part moving mechanism arranged in this manner, the camera is capable of moving the flash emission part 10 sufficiently away from the optical axis of the photo-taking lens while retaining its good operability.

Further, with the two levers 19 and 21 used for the flash-emission-part moving mechanism, the operating direction of the operation member 18 can be arranged to coincide with the moving direction of the flash emission part 10. That arrangement improves the operability of the camera in terms of operation feeling of the operator.

Second Embodiment

FIGS. 9 to 12 show a flash-emission-part moving mechanism of a camera according to a second embodiment of the invention. All component elements of the mechanism of the second embodiment that are arranged in the same manner as in the first embodiment described above are indicated by the same reference numerals used in the foregoing description of the first embodiment.

The second embodiment differs from the first embodiment in the following point. In the second embodiment, the output end 19d' of a first lever 19' is engaged with the input end 21b' of a second lever 21' through a torsion spring (elastic member) 30 which is mounted around the turning shaft 21a' of the second lever 21'.

Further, both the output end 19d' of the first lever 19' and the input end 21b' of the second lever 21' are disposed between the spring ends 30a and 30b of the torsion spring 30.

Figure 9:
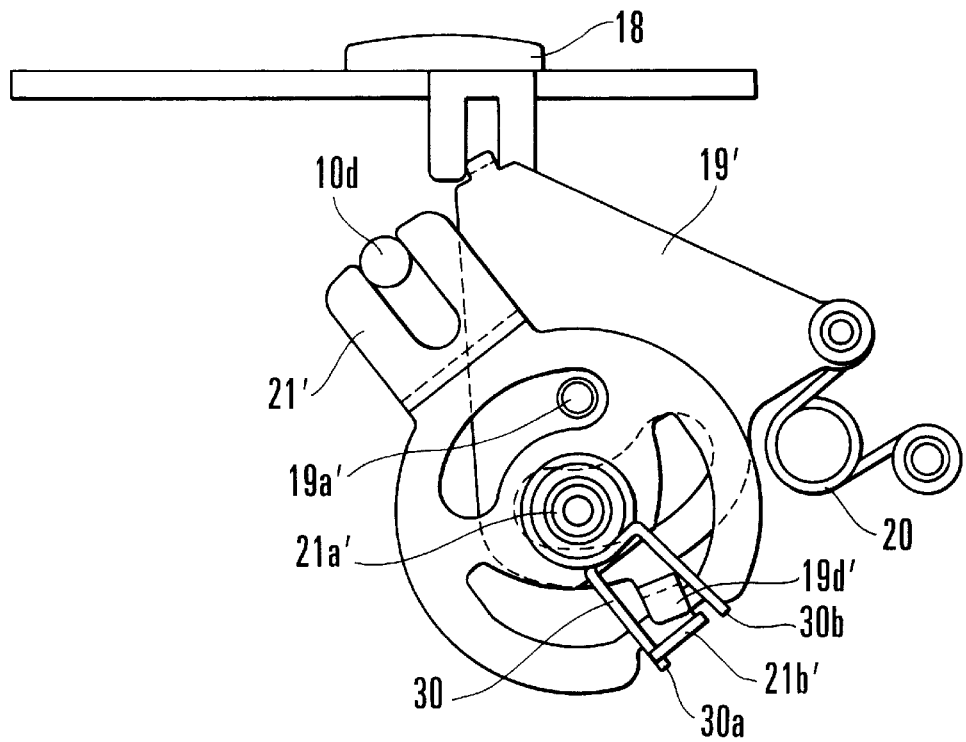
FIG. 9 is a diagram for explaining an operation of a flash-emission-part moving mechanism of a camera according to a second embodiment of the invention when a flash emission part thereof is in the stowage position.

FIG. 9 shows the flash-emission-part moving mechanism in a state of having the flash emission part 10 in a stowage position. In this state, the spring end 30b of the torsion spring 30 is abutting on a bent part formed at the output end 19d' of the first lever 19', and the spring end 30a of the torsion spring 30 is abutting on a bent part formed at the input end 21b' of the second lever 21', so that the torsion spring 30 is thus in a somewhat charged state. This is because the force of the toggle spring 20 urging the first lever 19' to turn is sufficiently stronger than the spring force of the torsion spring 30. Accordingly, the flash emission part 10 is urged in the direction of stowing by the spring force received from the spring end 30a of the torsion spring 30 through the second lever 21'.

Figure 10:
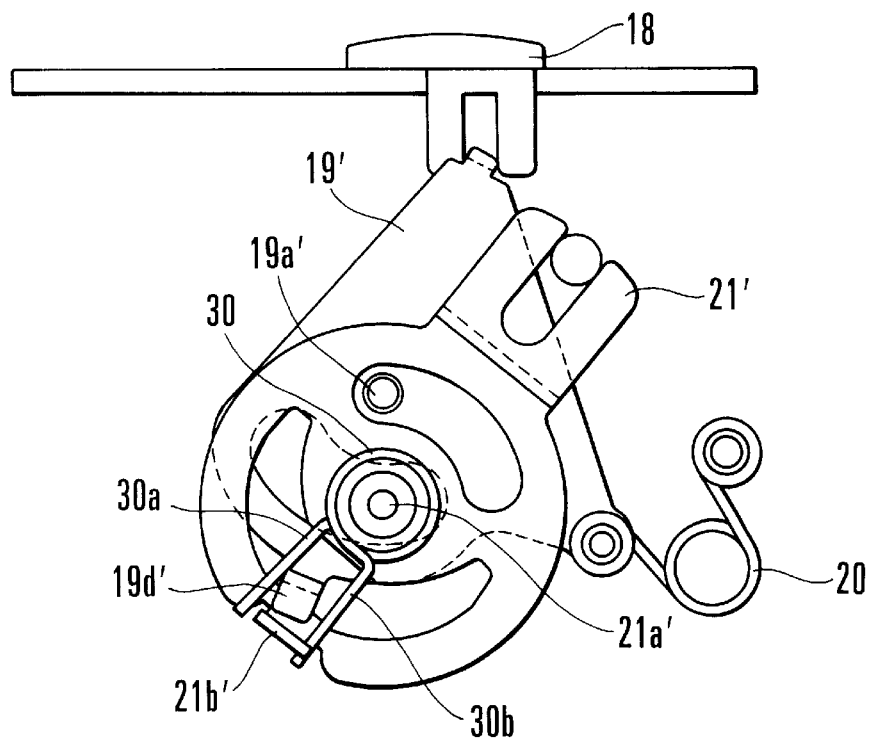
FIG. 10 is a diagram for explaining an operation of the flash-emission-part moving mechanism according to the second embodiment when the flash emission part is in the protruding position.

On the other hand, FIG. 10 shows the flash-emission-part moving mechanism in a state of having the flash emission part 10 in a protruding (usage) position. In that state, the spring end 30a of the torsion spring 30 abuts on the bent part formed at the output end 19d' of the first lever 19', and the spring end 30b of the torsion spring 30 abuts on the bent part formed at the input end 21b' of the second lever 21', so that the torsion spring 30 is in a somewhat charged state. Under this condition, the flash emission part 10 is urged in the direction of protruding by the spring force received from the spring end 30b of the torsion spring 30 through the second lever 21'.

The sliding operation of the flash-emission-part moving mechanism in the second embodiment is performed in about the same manner as in the case of the first embodiment. When the operation member 18 is operated, the first and second levers 19' and 21' respectively turn in association with the operating motion of the operation member 18 to drive the flash emission part 10 to move in the direction of protruding or stowing. Further, in the second embodiment, too, the lever ratio of the first lever 19' is about 1:1 and the lever ratio of the second lever 21' is about 1:2. Therefore, the moving amount of the flash emission part 10 is about twice as much as the moving amount of the operation member 18.

Figure 11:
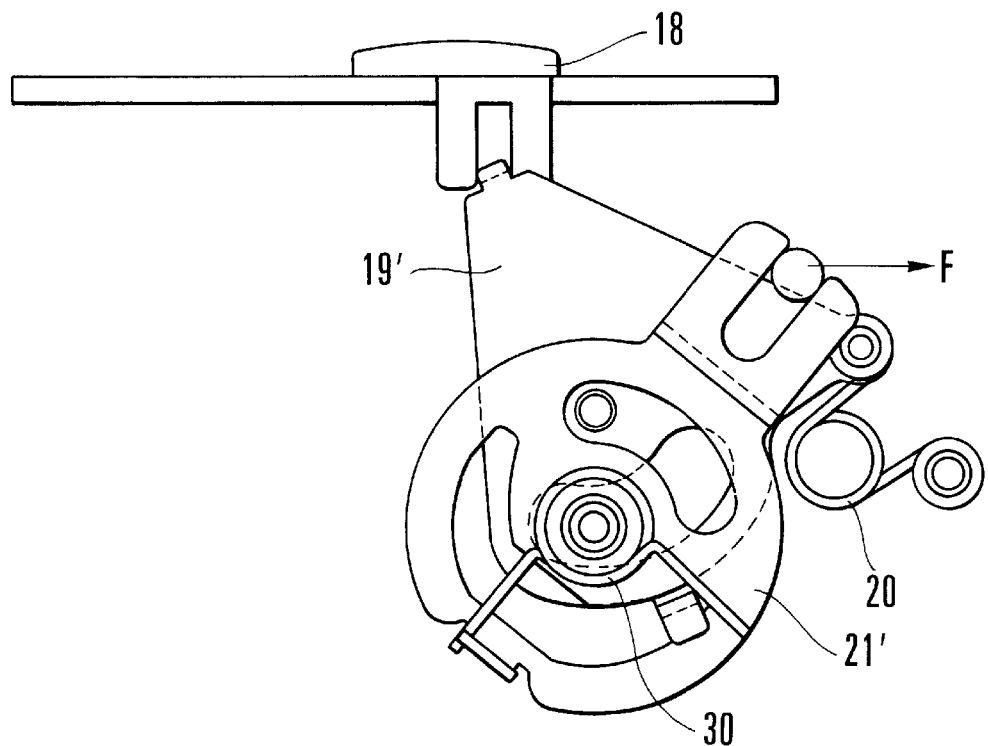
FIG. 11 is a diagram for explaining an operation of the flash-emission-part moving mechanism according to the second embodiment when an external force F is applied to the flash emission part while the flash emission part is in the stowage position.
Figure 12:
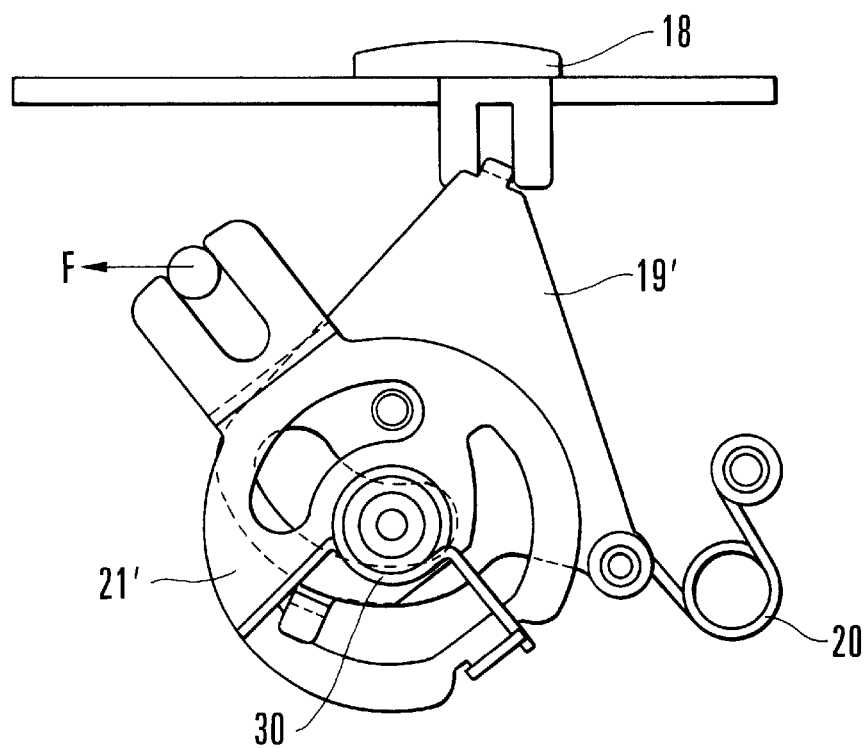
FIG. 12 is a diagram for explaining an operation of the flash-emission-part moving mechanism according to the second embodiment when an external force F is applied to the flash emission part while the flash emission part is in the protruding position.

However, in the second embodiment, when an external force F is exerted to forcibly pull the flash emission part 10 either from the stowage position toward the protruding position, as shown in FIG. 11, or from the protruding position toward the stowage position, as shown in FIG. 12, the flash emission part 10 moves along the guide bar 13 in the direction in which the external force F is exerted, and the second lever 21' also turns accordingly. Then, since the toggle spring 20 has a spring force set to be sufficiently stronger than the spring force of the torsion spring 30, as mentioned above, the turn of the second lever 21 is absorbed by the charged state of the torsion spring 30 and thus does not cause the first lever 19' to turn. Therefore, no force acts excessively on the first lever 19' nor on the operation member 18.

When the external force F disappears, the force of restoration of the torsion spring 30 causes the second lever 21 to turn back to its original position, so that the flash emission part 10 can resume its original position. The second embodiment is thus arranged such that, even in the event of unexpected or unintended exertion of an external force on the camera, the operation member 18 is not moved by the external force and the flash emission part 10 resumes its position upon disappearance of the external force. This arrangement prevents the power supply of the camera from being inadvertently turned on and enables a flash photographing operation to be carried out without hindrance. The operability of the camera, therefore, can be improved by this arrangement.

The flash-emission-part moving mechanism in each of the embodiments disclosed is composed of two levers. However, the arrangement of the flash-emission-part moving mechanism according to the invention is of course not limited to the specific number and shapes of the levers described in the foregoing.

What is claimed is:

1. A camera comprising:
   a) a flash emission part arranged to move between a stowage position and a usage position;
   b) an operation member capable to being displaced by a sliding operation in a predetermined direction; and
   c) a transmission member which enlarges an amount of displacement by said sliding operation of said operation member and transmits said enlarged amount of displacement to said flash emission part,
   wherein said transmission member enlarges a sliding amount in a first direction of said operation member and transmits said enlarged amount of sliding to said flash emission part, so that the flash emission part is moved from said stowage position to said usage position, and said transmission member enlarges an amount of sliding in a second direction of said operation member and transmits said enlarged amount of sliding in said second direction to said flash emission part, said second direction being contrary to said first direction, so that said flash emission part is moved from said usage position to said stowage position.

2. A camera according to claim 1, wherein said flash emission part is arranged to move between the stowage position and the usage position by moving in the same direction as the predetermined direction in which said operation member is capable of being displaced by the sliding operation.

3. A camera according to claim 1, wherein said transmission member includes a plurality of levers which differ from each other in center of turning.

4. A camera according to claim 3, wherein said transmission member includes a first lever having an input end thereof connected to said operation member and a second lever having an input end thereof connected to an output end of said first lever and an output end thereof connected to said flash emission part.

5. A camera according to claim 4, wherein the output end of said first lever and the input end of said second lever are connected to each other through a spring.

6. A camera according to claim 1, further comprising a toggle spring which urges said flash emission part toward the stowage position when said flash emission part is located near to the stowage position and urges said flash emission part toward the usage position when said flash emission part is located near to the usage position.

7. A camera according to claim 1, wherein a power supply of said camera is turned on or off in association with an operation on said operation member.

8. A camera according to claim 1, further comprising a fixing member arranged to fix said transmission member to said camera, wherein a protruding part formed on said flash emission part is engaged with an end part of said fixing member.

9. A camera according to claim 1, further comprising a detection switch which detects that said flash emission part has moved close to the usage position.

10. A camera according to claim 9, wherein said flash emission part is controlled to be readied for flash light emission when said detection switch has detected that said flash emission part has moved close to the usage position.

11. A camera comprising:
   a) a flash emission part arranged to move between a stowage position and a usage position;
   b) an operation member capable of being displaced by being operated in a predetermined direction; and
   c) a transmission member which enlarges an amount of displacement by the operation of said operation member and transmits the enlarged amount of displacement to said flash emission part,
   wherein said transmission member enlarges an amount of displacement in a first direction of said operation member and transmits the enlarged amount of displacement in the first direction to said flash emission member so that said flash emission part is moved from said stowage position to said usage position, and said transmission member enlarges an amount of displacement in a second direction of said operation member and transmits the enlarged amount of displacement in the second direction to said flash emission part, said second direction being contrary to said first direction, so that said flash emission part is moved from said usage position to said storage position.

12. A camera according to claim 11, wherein said flash emission part is arranged to move between the stowage position and the usage position by moving in the same direction as the predetermined direction in which said operation member is operated.

13. A camera according to claim 11, wherein said transmission member includes a first lever having an input end thereof connected to said operation member and a second lever having an input end thereof connected to an output end of said first lever and an output end thereof connected to said flash emission part.

14. A camera according to claim 11, further comprising a toggle spring which urges said flash emission part toward the stowage position when said flash emission part is located near to the stowage position and urges said flash emission part toward the usage position when said flash emission part is located near to the usage position.

15. A camera according to claim 11, wherein a power supply of said camera is turned on or off in association with an operation on said operation member.

16. A camera according to claim 11, further comprising a detection switch which detects that said flash emission part has moved close to the usage position.

* * * * *